United States Patent
Wu et al.

(10) Patent No.: US 8,400,967 B2
(45) Date of Patent: Mar. 19, 2013

(54) EVOLVED NODEB, RELAY NODE AND CONNECTION INITIALIZATION METHOD THEREOF

(75) Inventors: Chih-Chiang Wu, Shalu Township (TW); Kanchei Loa, Taipei (TW); Shu-Tsz Liu, Taipei (TW)

(73) Assignee: Institute for Information Industry, Taipei (TW)

( * ) Notice: Subject to any disclaimer, the term of this patent is extended or adjusted under 35 U.S.C. 154(b) by 405 days.

(21) Appl. No.: 12/858,965

(22) Filed: Aug. 18, 2010

(65) Prior Publication Data

US 2011/0044249 A1 Feb. 24, 2011

Related U.S. Application Data

(60) Provisional application No. 61/234,639, filed on Aug. 18, 2009, provisional application No. 61/242,817, filed on Sep. 16, 2009, provisional application No. 61/245,262, filed on Sep. 23, 2009.

(51) Int. Cl.
*H04W 4/00* (2009.01)

(52) U.S. Cl. .......... 370/328; 370/331; 370/349
(58) Field of Classification Search ......... 370/328–331, 370/349
See application file for complete search history.

(56) References Cited

U.S. PATENT DOCUMENTS

| | | | |
|---|---|---|---|
| 8,089,936 B2* | 1/2012 | Watanabe | 370/331 |
| 8,165,054 B2* | 4/2012 | Becker et al. | 370/312 |
| 8,249,018 B2* | 8/2012 | Gonsa et al. | 370/331 |
| 2009/0240795 A1* | 9/2009 | Tsirtsis et al. | 709/223 |

* cited by examiner

*Primary Examiner* — Phuc Tran
(74) *Attorney, Agent, or Firm* — Skaar Ulbrich Macari, P.A.

(57) ABSTRACT

An evolved NodeB eNB, a first relay node (RN) and a connection initialization method thereof for use in a long term evolution (LTE) network are provided. The LTE network comprises the eNB, the first RN, a second RN and a mobility management entity (MME). In the LTE network of the present invention, various multi-hop protocols can be achieved by using different identification mapping implementations.

42 Claims, 14 Drawing Sheets

US 8,400,967 B2

EVOLVED NODEB, RELAY NODE AND CONNECTION INITIALIZATION METHOD THEREOF

PRIORITY

This application claims the benefit of U.S. Provisional Application Ser. No. 61/234,639, filed on Aug. 18, 2009, U.S. Provisional Application Ser. No. 61/242,817, filed on Sep. 16, 2009, and U.S. Provisional Application Ser. No. 61/245,262, filed on Sep. 23, 2009, all of which are hereby incorporated by reference herein.

FIELD

The present invention relates to an evolved nodeB, a relay node and a connection initialization method thereof. More particularly, the evolved nodeB, the relay node and the initialization method thereof of the present invention are for use in a long term evolution network which supports multi-hop connection.

BACKGROUND

Wireless network technologies are commonly and widely used in nowadays. In order to provide better qualities of service and wider communication ranges between the wireless apparatus, the concept of relay node has been introduced in network systems. The purpose of deploying relay node in network system is to extend the serving coverage of base station; hence, user equipment which is not within the communication coverage of base node can access the services provided by relay node as well via base node.

However, in some developing network systems, the hardware modules, protocols and communicating procedures for the network architectures with multi-hop relay nodes are not efficiently developed yet. Particularly, in long term evolution (LTE) or long term evolution-advanced (LTE-A) network systems, there is no suitable protocol yet for introducing multi-hop relay nodes.

Therefore, since LTE/LTE-A are significant network systems nowadays, improved proposals of the hardware modules, protocols and communication procedures for multi-hop relay nodes used in the LTE/LTE-A network systems are needed.

SUMMARY

One objective of certain embodiments of the invention is to provide a connection initialization method for an evolved NodeB (eNB). The eNB is adapted for use in a long term evolution (LTE) network. The LTE network comprises the eNB, a mobility management entity (MME), a first relay node (RN) and a second RN. The eNB connects with the MME. The first RN connects with the eNB. The second RN connects with the eNB via the first RN. The eNB pre-allocates a first identification group and a second identification group to the first RN and the second RN respectively. The connection initialization method comprises the following steps: (a) enabling the eNB to receive an initial message with an eNB-UE-S1AP identification (EID) from the second RN via the first RN after the second RN receives an attached request from a user equipment, wherein the EID is selected from the second identification group and assigned to a control-plane connection of the user equipment by the second RN; (b) enabling the eNB to transmit the initial message with the EID to the MME; (c) enabling the eNB to receive an initial response with a first MME-UE-S1AP identification (MID) from the MME after step (b), wherein the first MID is assigned to the control-plane connection of the user equipment by the MME; (d) enabling the eNB to convert the first MID into a second MID; and (e) enabling the eNB to transmit the initial response with the second MID to the second RN via the first RN.

Another objective of certain embodiments of the invention is to provide an eNB for use in an LTE network. The LTE network comprises the eNB, an MME, a first RN and a second RN. The eNB connects with the MME. The first RN connects with the eNB. The second RN connects with the eNB via the first RN. The eNB pre-allocates a first identification group and a second identification group to the first RN and the second RN respectively. The eNB comprises a transceiver and a processing unit. The transceiver is configured to receive an initial message with an EID from the second RN via the first RN after the second RN receives an attached request from a user equipment, to transmit the initial message with the EID to the MME and to receive an initial response with a first MID from the MME. The EID is selected from the second identification group and assigned to a control-plane connection of the user equipment by the second RN and the first MID is assigned to the control-plane connection of the user equipment by the MME. The processing unit is configured to convert the first MID into a second MID. And then the transceiver is further configured to transmit the initial response with the second MID to the second RN via the first RN.

Yet a further objective of certain embodiments of the invention is to provide a connection initialization method for a first RN. The first RN is adapted for use LTE network. The LTE network comprises an eNB, an MME, the first RN and a second RN. The eNB connects with the MME. The first RN connects with the eNB. The second RN connects with the eNB via the first RN. The eNB pre-allocates a first identification group and a second identification group to the first RN and the second RN respectively. The initialization method comprises the following steps: (a) enabling the first RN to receive an initial message with an EID from the second RN after the second RN receives an attached request from a user equipment, wherein the EID is selected from the second identification group and assigned to a control-plane connection of the user equipment by the second RN; (b) enabling the first RN to forward the initial message with the EID to the eNB so that the eNB can forward the initial message with the EID to the MME; (c) enabling the first RN to receive an initial response with a second MID from the eNB after step (b), wherein the second MID is converted from a first MID by the eNB after the MME assigns the first MID to the control-plane connection of the user equipment and transmits the initial response with the first MID to the eNB; (d) enabling the first RN to forward the initial response with the second MID to the second RN.

Yet a further objective of certain embodiments of the invention is to provide a first RN for use in an LTE network. The LTE network comprises an eNB, an MME, the first RN and a second RN. The eNB connects with the MME. The first RN connects with the eNB. The second RN connects with the eNB via the first RN. The eNB pre-allocates a first identification group and a second identification group to the first RN and the second RN respectively. The first RN comprises a transceiver. The transceiver is configured to receive an initial message with an EID from the second RN after the second RN receives an attached request from a user equipment, to forward the initial message with the EID to the eNB so that the eNB can forward the initial message with the EID to the MME, to receive an initial response with a second MID from the eNB, and to forward the initial response with a second MID to the second RN. The EID is selected from the second identification group and assigned to a control-plane connection of the user equipment by the second RN, the second MID is converted from a first MID by the eNB after the MME assigns the first MID to the control-plane connection of the user equipment and transmits the initial response with the first MID to the eNB.

Yet a further objective of certain embodiments of the invention is to provide a connection initialization method for a second RN. The second RN is adapted for use in an LTE network. The LTE network comprises an eNB, an MME, a first RN and the second RN. The eNB connects with the MME. The first RN connects with the eNB. The second RN connects with the eNB via the first RN. The eNB pre-allocates a first identification group and a second identification group to the first RN and the second RN respectively. The initialization method comprises the following steps: (a) enabling the second RN to receive an attached request from a user equipment; (b) enabling the second RN to select an EID from the second identification group and to assign the EID to a control-plane connection of the user equipment; (c) enabling the second RN to transmit an initial message with the EID to the eNB via the first RN; (d) enabling the second RN to receive an initial response with a second MID from the eNB via the first RN after the eNB converts a first MID to the second MID, wherein the first MID is assigned to the control-plane connection of the user equipment by the MME after the MME transmits the initial response with the first MID to the eNB.

Yet a further objective of certain embodiments of the invention is to provide a second RN for use in an LTE network. The LTE network comprises an eNB, an MME, a first RN and the second RN. The eNB connects with the MME. The first RN connects with the eNB. The second RN connects with the eNB via the first RN. The eNB pre-allocates a first identification group and a second identification group to the first RN and the second RN respectively. The first RN comprises a transceiver and a processing unit. The transceiver is configured to receive an attached request from a user equipment. The processing is configured to select an EID from the second identification group and to assign the EID to a control-plane connection of the user equipment. The transceiver is further configured to transmit an initial message with the EID to the eNB via the first RN and to receive an initial response with a second MID from the eNB via the first RN after the eNB converts a first MID to the second MID. The first MID is assigned to the control-plane connection of the user equipment by the MME after the MME transmits the initial response with the first MID to the eNB.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to various example embodiments; nevertheless, these embodiments are not intended to limit the present invention to any specific environment, embodiment, example, applications, or particular implementations described in these example embodiments. Therefore, descriptions of these example embodiments are only provided for purpose of illustration but not to limit the present invention. It should be appreciated that elements unrelated directly to the present invention are omitted from the example embodiments and the attached drawings.

Figure 1A:
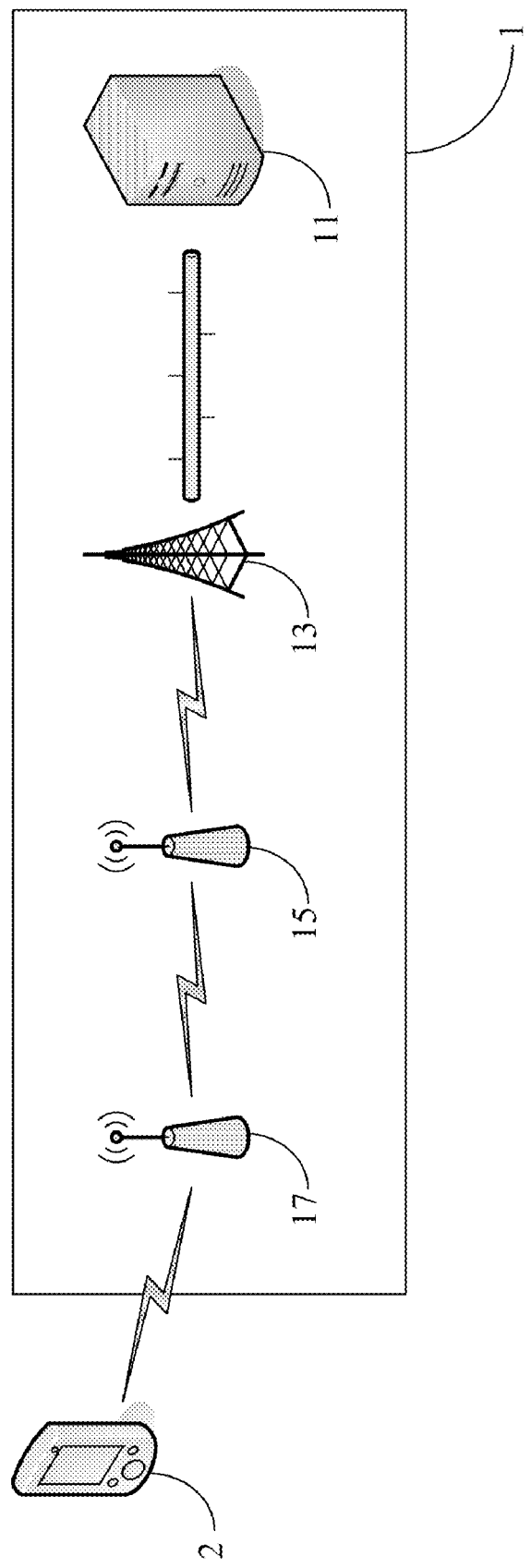
FIG 1A illustrates an LTE network of a first embodiment of the present invention.

FIG. 1A illustrates a first embodiment of the present invention, which is a long term evolution (LTE) network system 1. The LTE network system 1 comprises a mobility management entity (MME) 11, an evolved NodeB (eNB) 13, a first relay node (RN) 15 and a second RN 17. As illustrated in FIG. 1A, the eNB 13 connects with the MME 11 wiredly, the first RN 15 connects with the eNB 13 wirelessly, and the second RN 17 connects with the eNB 13 via the first RN 15. Accordingly, a multi-hop environment is deployed in the LTE network system 1. Before the LTE network system 1 provides services to user equipments, the eNB 13 pre-allocates a first identification group (not shown) and a second identification group (not shown) to the first RN 15 and the second RN 17 respectively. The first identification group presents a range of usable identifications, and the second identification group presents another range of usable identifications. It should be noted that each of the identifications, allocated by the eNB 13, in the first identification group and the second identification group are different so that the identifications can be used for identifying a user equipment in the LTE network 1.

It should be appreciated that it is not intended to limit the RNs of the present invention to any specific number. People skilled in this field should understand that a network with two RNs forms a multi-hop network as well as a network with more than two RNs; accordingly, the people skilled in this field can easily apply the present invention into any network with a plurality of RNs.

Figure 1B:
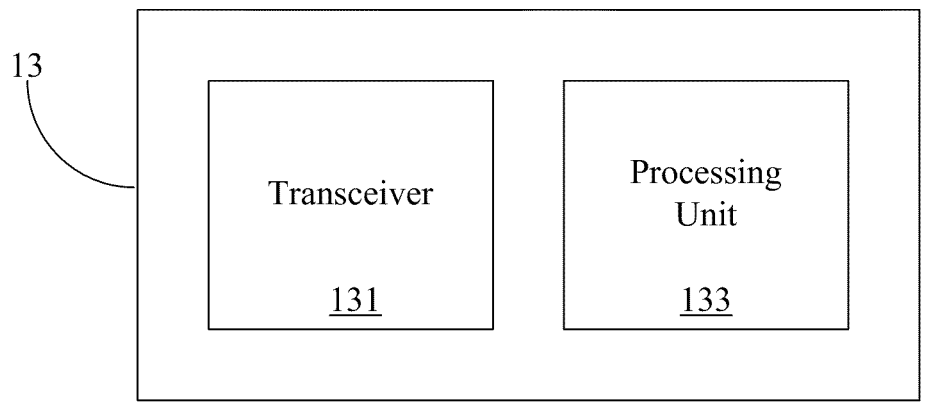
FIG. 1B illustrates a schematic view of the eNB of the first embodiment.
Figure 1C:
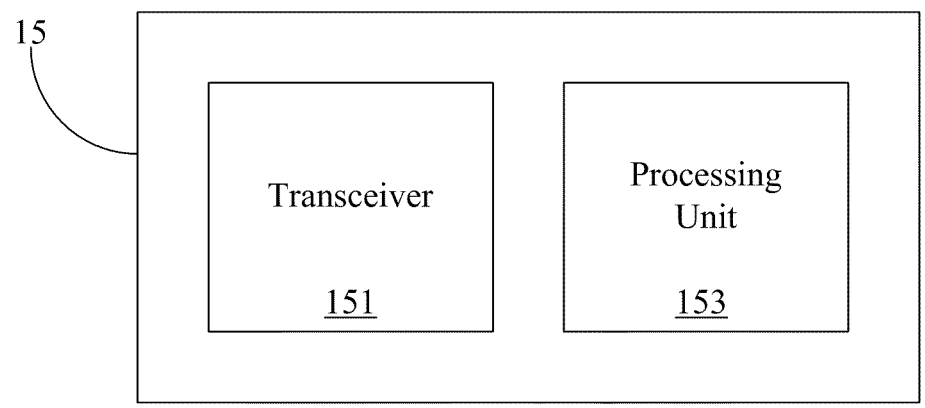
FIG. 1C illustrates a schematic view of the first RN of the first embodiment.
Figure 1D:
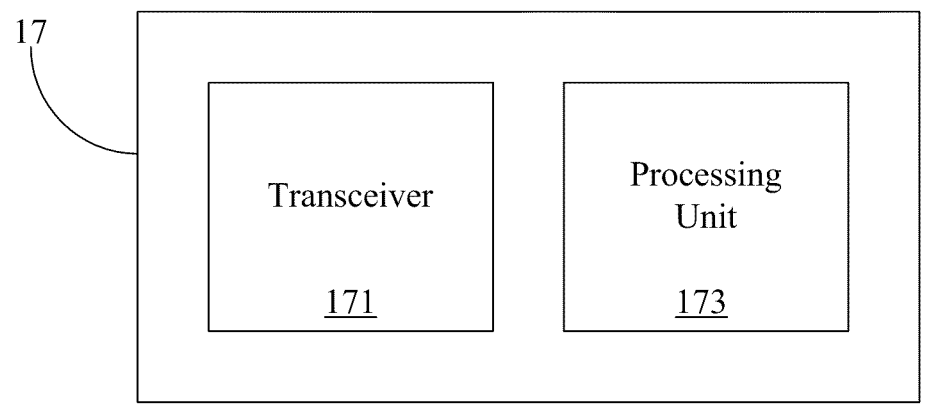
FIG. 1D illustrates a schematic view of the second RN of the first embodiment
Figure 1E:
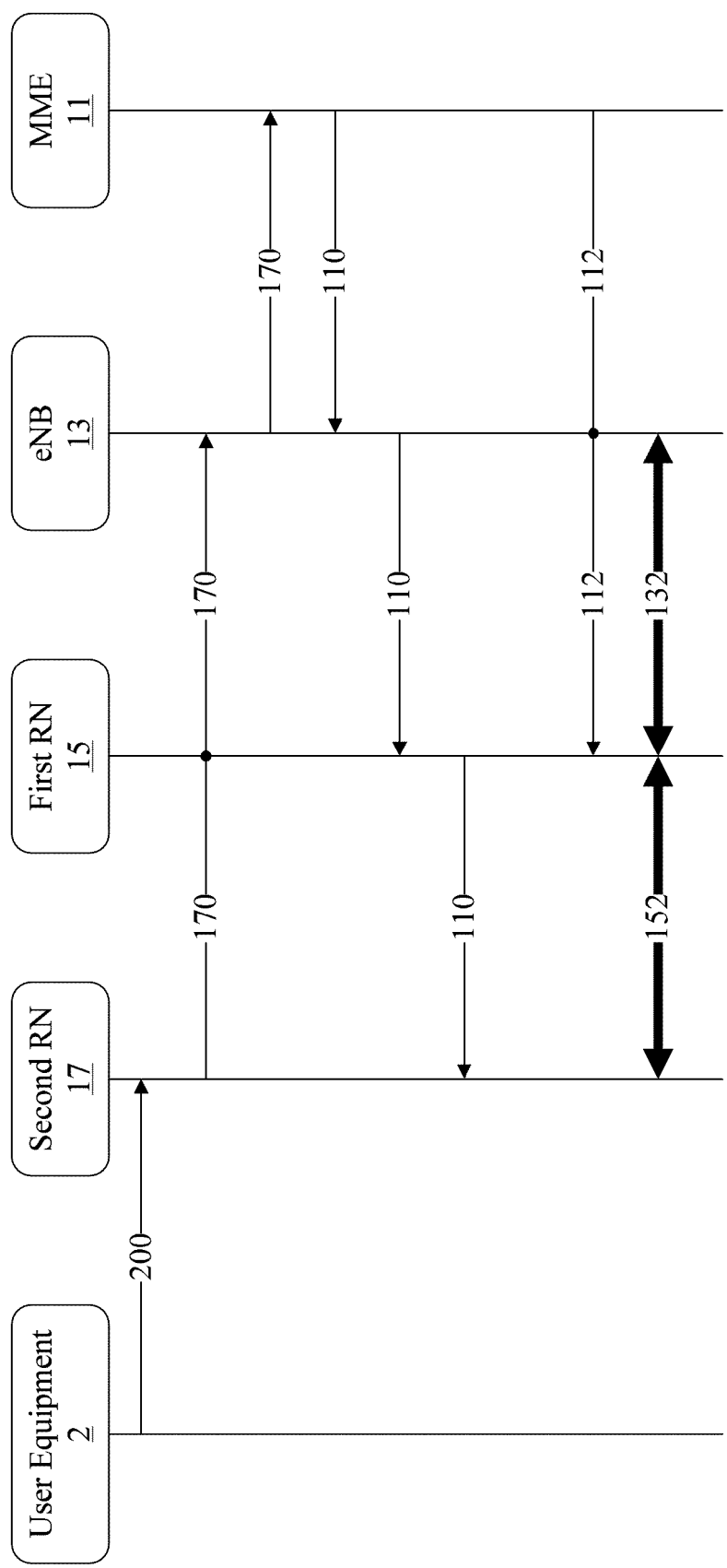
FIG. 1E illustrates the signal flows of an example in the first embodiment.

Please refer to FIG. 1B, FIG. 1C and FIG. 1D. FIG. 1B is a schematic view of the eNB 13 of the first embodiment, FIG. 1C is a schematic view of the first RN 15 of the first embodiment, and FIG. 1D is a schematic view of the second RN 17 of the first embodiment. And then refer to FIG 1E at the same time. FIG. 1E illustrates a signal flows of an example in the first embodiment. First, a user equipment 2 intends to connect to the LTE network system 1, then the user equipment 2 transmits an attached request 200 to the second RN 17. After the transceiver 171 of the second RN 17 receives the attached request 200 from the user equipment 2, the processing unit 173 of the second RN 17 selects an eNB-UE-S1AP identification (EID) (not shown) from the second identification group, and then assigns the EID to a control-plane connection of the user equipment 2. Hence, the control-plane connection of the user equipment 2 can be identified in the LTE network 1 based on the EID.

Afterwards, the transceiver 171 of the second RN 17 transmits an initial message 170 with the EID to the first RN 15. After receiving the initial message 170, the transceiver 151 of the first RN 15 forwards the initial message 170 with the EID to the eNB 13 directly. In other words, the transceiver 131 of the eNB 13 receives the initial message 170 with the EID from the second RN 17 via the forwarding of the transceiver 151 of the first RN 15. Then, the transceiver 131 of the eNB 13 transmits the initial message 170 with the EID to the MME 11. After receiving the initial message 170, the MME 11 assigns a first MME-UE-S1AP identification (MID) (not shown) to the control-plane connection of the user equipment 2.

Next, after approving the attached request from the user equipment 2, the MME 11 transmits an initial response 110 with the MID back to the eNB 13. After the transceiver 131 of the eNB 13 receives the initial response 110 with the first MID, the processing unit 133 converts the first MID to a second MID (not shown). Accordingly, the eNB 13 can keep a mapping relation for the control-plane between the eNB 13 and the MME 11 so that the control messages can be transmitted correctly between the eNB 13 and the MME 11.

Afterwards, the transceiver 131 of the eNB 13 transmits the initial response 110 with the second MID to the first RN 15. After receiving the initial response 110, the transceiver 151 of the first RN 15 forwards the initial response 110 with the second MID to the second RN 17. In other words, the transceiver 131 of the eNB 13 transmits the initial response 110 with the second MID to the second RN 17 via the first RN 15; specifically, the transceiver 171 of the second RN 17 receives the initial response 110 with the second MID from the eNB 13 via the first RN 15.

Accordingly, the control messages can be transmitted correctly between the MME 11, the eNB 13, the first RN 15 and the second RN 17 according to the EID and the mapping relation between the first MID and the second MID. It should be noted that the eNB 13 can use a forward table for recording the forwarding relation of the control messages between the first RN 15 and the MME 11, and use a conversion table for recording the mapping relation between the first MID and the second MID. Similarly, the first RN 15 can use a forward table for recording the forwarding relation of the control messages between the eNB 13 and the second RN 17.

Accordingly, the establishment of the control-planes of the LTE network 1 is accomplished. Next, user-planes of the LTE network 1 should be established. In the first embodiment, the user-planes between the eNB 13, the first RN 15 and the second RN 17 of the LTE network 1 are established at the same time. Please still refer to FIG. 1E, after the establishment of the control-planes, the MME 11 transmits an S1-AP message 112 to the eNB 13 and to the first RN 15 at the same time. More precisely, after receiving the S1-AP message 112, the transceiver 131 of the eNB 13 forwards the S1-AP message 112 to the first RN 15 instantly. In other words, the transceiver 15 of the first RN 15 receives the S1-AP message from the MME 11 via the forwarding of the eNB 13.

Therefore, the processing unit 133 of the eNB 13 can establish a first bearer 132 between the eNB 13 and the first RN 15 according to the S1-AP message 112, and the processing unit 153 of the first RN 15 can establish a second bearer 152 between the first RN 15 and the second RN 17. In the other hand, the transceiver 171 of the second RN 17 receives a bearer setup request from the first RN 15 for the processing unit 173 of the second RN 17 to set up the second bearer 152 between the first RN 15 and the second RN 17. It should be noted that the first bearer 132 and the second bearer 152 can be established by the eNB 13 and the first RN 15 respectively at the same time since the S1-AP message 112 can be transmitted to the eNB 13 and the first RN 15 at the same time.

A second embodiment of the present invention is also the LTE network 1. Similarly, an establishment of the control-planes in the second embodiment is the same as the establishment of the control-planes described in the first embodiment; hence, the details will be not further described again. The difference between the first embodiment and the second embodiment is the establishment of the user-planes. Particularly, the user-planes of the first embodiment in the LTE network 1 are established at the same time while the user-planes of the second embodiment in the LTE network 1 are established separately.

Figure 2:
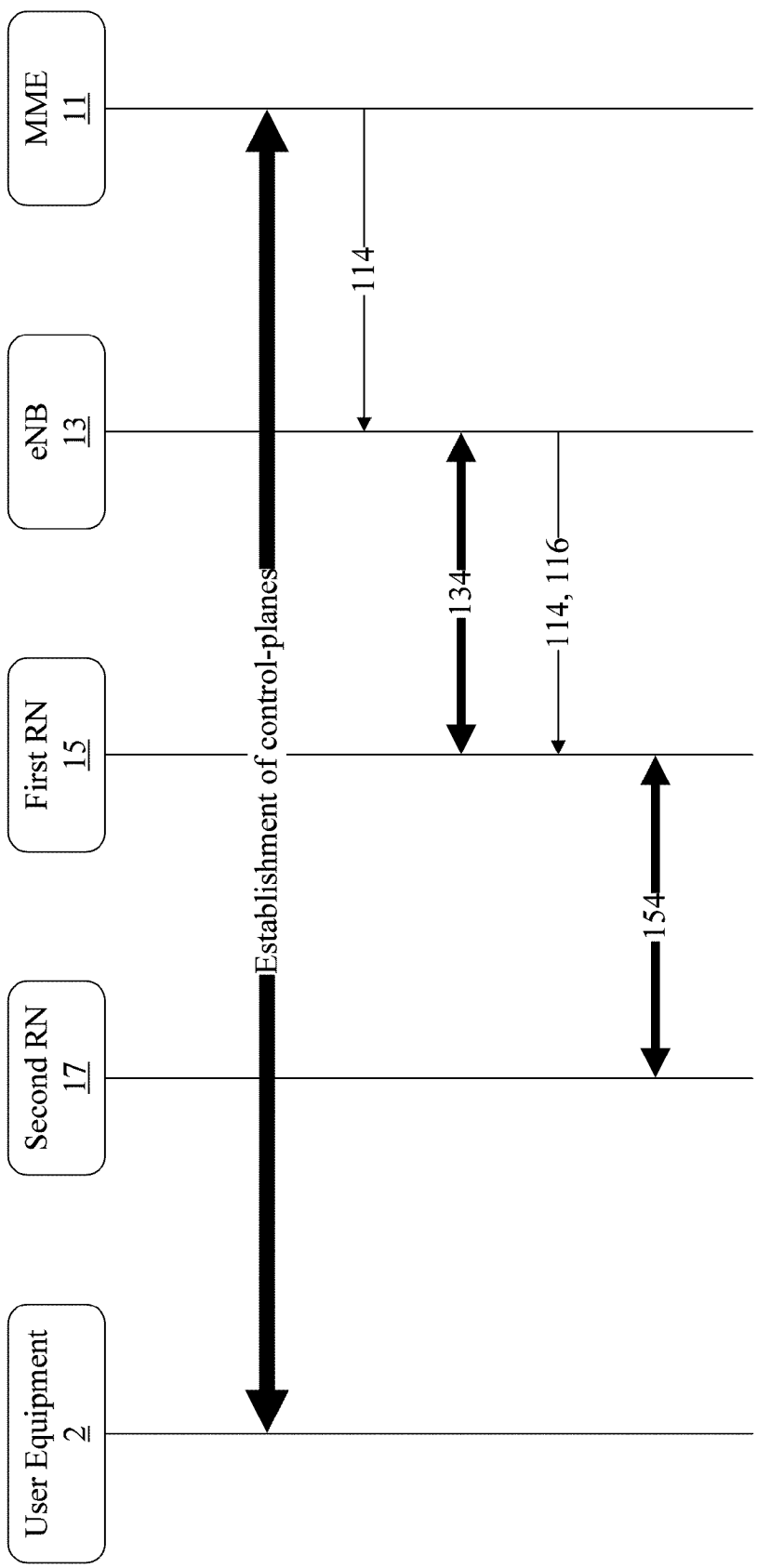
FIG. 2 illustrates the signal flows of an example in the second embodiment.

Please refer to FIG. 2. After the establishment of the control-planes, the MME 11 transmits an S1-AP message 114 to the eNB 13. Then the processing unit 133 of the eNB 13 establishes a first bearer 134 between the eNB 13 and the first RN 15 according to the S1-AP message 114 after the transceiver 131 of the eNB 13 receives the S1-AP message 114 from the MME 11. Afterwards, the transceiver 131 of the eNB 13 transmits the S1-AP message 114 to the first RN 15 after the establishment of the first bearer 134. And then, the processing unit 153 of the first RN 15 establishes a second bearer 154 between the first RN 15 and the second RN 17 after the transceiver 151 of the first RN 15 receives the S1-AP message 114 from the eNB 13. In the other hand, the transceiver 171 of the second RN 17 receives a bearer setup request from the first RN 15 for the processing unit 173 of the second RN 17 to set up the second bearer 154 between the first RN 15 and the second RN 17.

Particularly, the transceiver 131 of the eNB 13 transmits a radio resource control (RRC) message 116 with the EID and the MID to the first RN 15 when transmitting the S1-AP message 114 to the first RN 15. After the transceiver 151 of the first RN 15 receiving the RRC message 116, the processing unit 153 of the first RN 15 establishes the second bearer 154 between the first RN 15 and the second RN 17 based on the RRC message 116. More specifically, the transceiver 171 of the second RN 17 receives the bearer setup request from the first RN 15 for the processing unit 173 of the second RN 17 to set up the second bearer 154 between the first RN 15 and the second RN 17 based on the RRC message 116. And then the processing unit 153 of the first RN 15 and the processing unit 173 of the second RN 17 connect the first bearer 134 and the second bearer 154 based on the EID and the MID. In other words, the connection of the first bearer 134 and the second bearer 154 can be achieved by the EID and the MID.

A third embodiment of the present invention is also the LTE network 1. Similarly, an establishment of the user-planes in the third embodiment is separated as the establishment of the user-planes described in the second embodiment. However, the difference between the third embodiment and the second embodiment is the procedures of establishing the user-planes.

Figure 3:
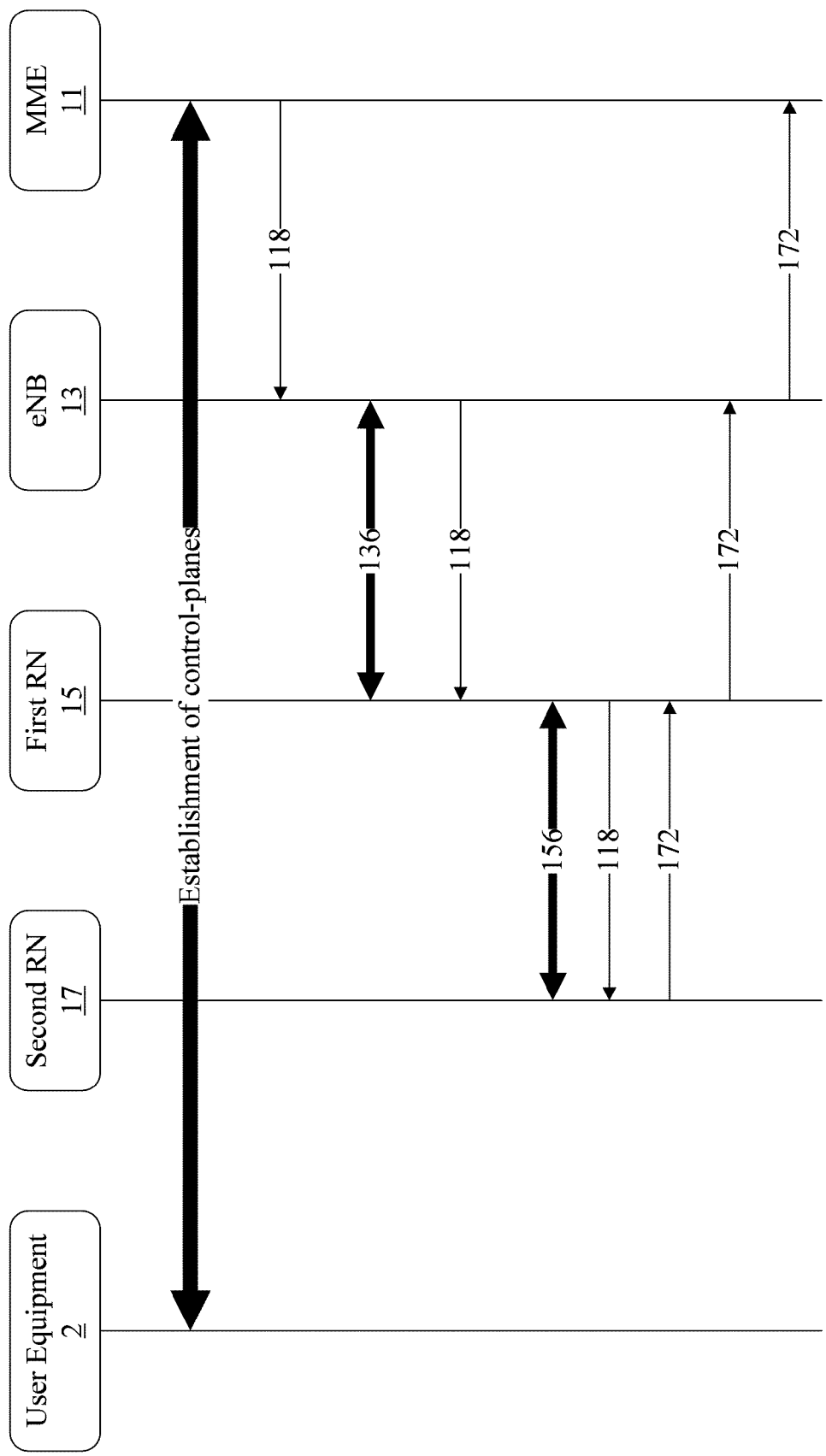
FIG. 3 illustrates the signal flows of an example in the third embodiment.

Please refer to FIG. 3. After the establishment of the control-planes, the MME 11 transmits an E-UTRAN radio access bearer (E-RAB) setup request 118 with a tunnel endpoint identification (TEID) to the eNB 13. Then the processing unit 133 of the eNB 13 establishes a first bearer 136 between the eNB 13 and the first RN 15 according to the E-RAB setup request 118 after the transceiver 131 of the eNB 13 receives the E-RAB setup request 118 from the MME 11. Afterwards, the processing unit 133 of the eNB 13 maps the TEID to a first data radio bearer identification (DRBID) (not shown). Then the processing unit 133 of the eNB 13 updates the E-RAB setup request 118 with the first DRBID. Accordingly, the transceiver 131 of the eNB 13 transmits the updated E-RAB setup request 118 with the first DRBID to the first RN 15.

Afterwards, the transceiver 151 of the first RN 15 receives the E-RAB setup request 118 with the first DRBID. Then the processing unit 153 of the first RN 15 establishes a second bearer 156 between the first RN 15 and the second RN 17 according to the E-RAB setup request 118 after the transceiver 151 of the first RN 15 receives the E-RAB setup request 118 from the eNB 13. In the other hand, the transceiver 171 of the second RN 17 receives a bearer setup request from the first RN 15 for the processing unit 173 of the second RN 17 to set up the second bearer 156 between the first RN 15 and the second RN 17. Afterwards, if the E-RAB setup request 118 is required forwarded to the second RN 17, the processing unit 153 of the first RN 15 maps the first DRBID to a second DRBID (not shown). Then the processing unit 153 of the first RN 15 updates the E-RAB setup request 118 with the second DRBID. Accordingly, the transceiver 151 of the first RN 15 transmits the updated E-RAB setup request 118 with the second DRBID to the second RN 17. In other words, the transceiver 173 of the second RN 17 receives the E-RAB setup request 118 with the second DRBID from the first RN 15 after the first RN 15 maps the first DRBID to the second DRBID.

Next, the transceiver 171 of the second RN 17 transmits an E-RAB setup response 172 with the second DRBID to the first RN 15. The processing unit 153 of the first RN 15 maps the second DRBID to the first DRBID after the transceiver 151 of the first RN 15 receives the E-RAB setup response 172. Then the processing unit 153 of the first RN 15 updates the E-RAB setup response 172 with the first DRBID. Afterwards, the transceiver 151 of the first RN 15 transmits the updated E-RAB setup response 172 with the first DRBID to the eNB 15.

Afterwards, the processing unit 133 of the eNB 13 maps the first DRBID to the TEID after the transceiver 131 of the eNB 13 receives the E-RAB setup response 172 with the first DRBID. Then, the processing unit 133 of the eNB 13 updates the E-RAB setup response 172. Accordingly, the transceiver 131 of the eNB 13 transmits the E-RAB setup response 172 with the TEID to the MME 11.

Accordingly, the correctness of the connections of the user-planes in the LTE network 1 can be assured based on the mapping relations between the E-RAB ID, TEID, the first DRBID and the second DRBID. It should be noted that, in the third embodiment, the E-RAB setup request 118 can be replaced by an initial context setup request while the E-RAB setup response 172 can be replaced by an initial context setup response. It can be easily understood by the people skilled in the LTE field.

A fourth embodiment of the present invention is also the LTE network 1. Similarly, an establishment of the user-planes in the fourth embodiment is separated as the establishment of the user-planes described in the second embodiment. However, the difference between the fourth embodiment and the second embodiment is also the procedures of establishing the user-planes.

Figure 4A:
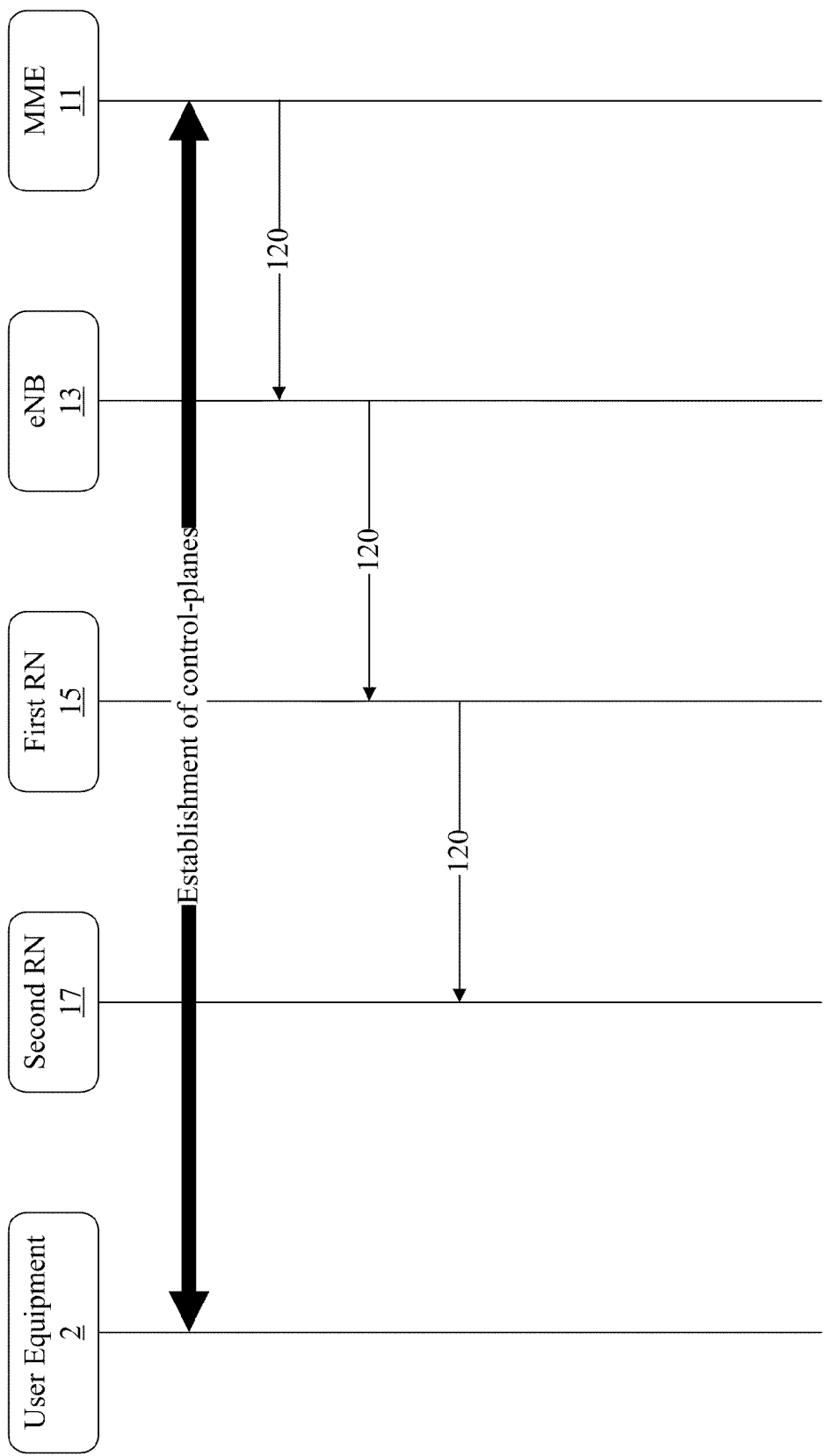
FIGS. 4A-4B illustrate the signal flows of an example in the fourth embodiment.
Figure 4B:
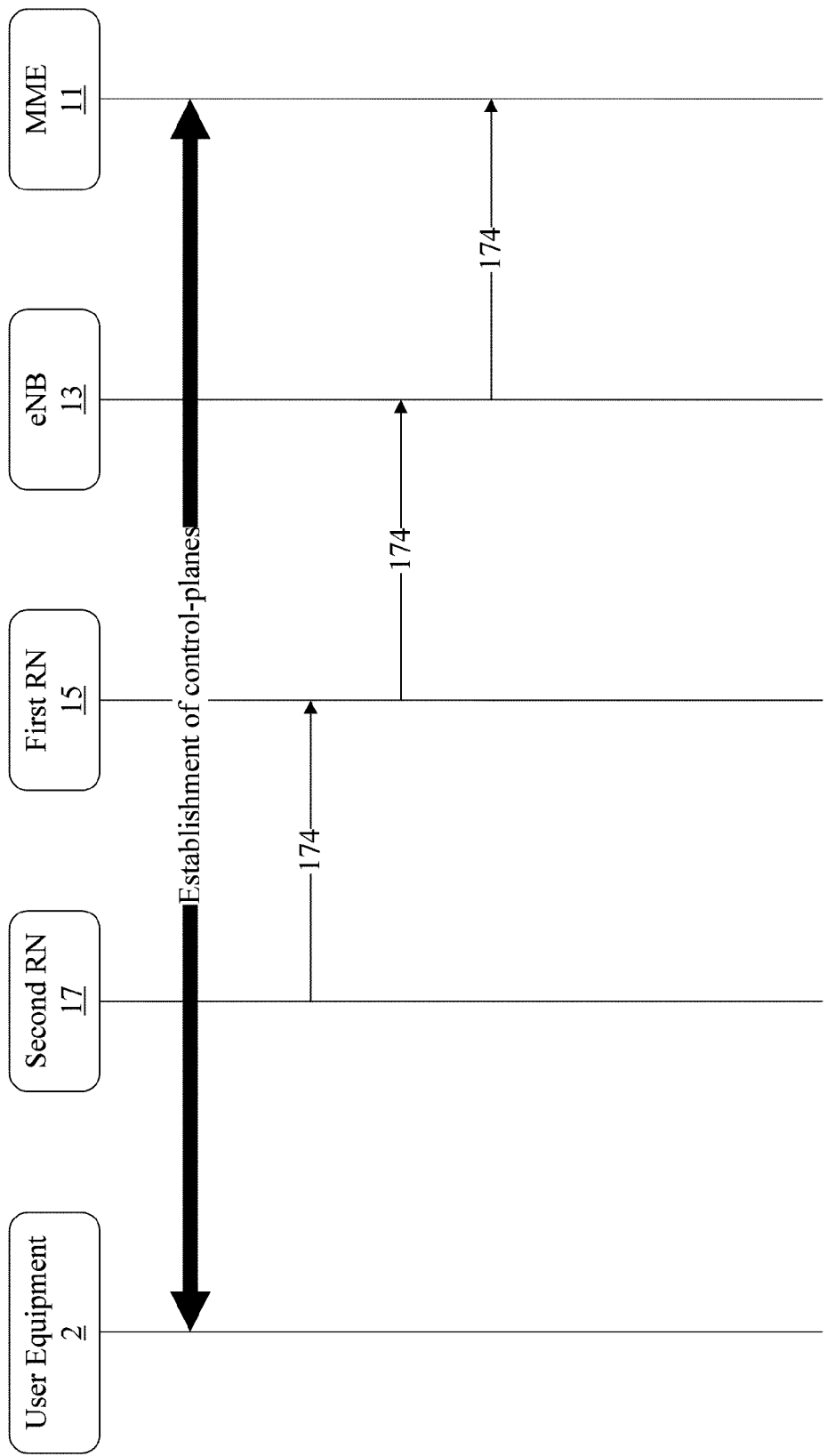

Please refer to FIGS. 4A-4B. After the establishment of the control-planes, the MME 11 transmits a first S1-AP handover message 120 with a tunnel endpoint identification (TEID) to the eNB 13. Then the transceiver 131 of the eNB 13 receives the first S1-AP handover message 120 from the MME 11. Afterwards, the processing unit 133 of the eNB 13 maps the TEID to a first DRBID (not shown). Next, the processing unit 133 of the eNB 13 updates the first S1-AP handover message 120 with the first DRBID. Accordingly, the transceiver 131 of the eNB 13 transmits the updated first S1-AP handover message 120 with the first DRBID to the first RN 15.

Afterwards, the transceiver 151 of the first RN 15 receives the first S1-AP handover message 120 with the first DRBID from the eNB 15. If the S1-AP handover message 120 is required forwarded to the second RN 17, the processing unit 153 of the first RN 15 maps the first DRBID to a second DRBID (not shown). Next, the processing unit 153 of the first RN 15 updates the first S1-AP handover message 120 with the second DRBID. Accordingly, the transceiver 151 of the first RN 15 transmits the updated first S1-AP handover message 120 with the second DRBID to the second RN 17. In other words, after the transceiver 151 of the first RN 15 receives the first S1-AP handover message 120 with the first DRBID, the processing unit 153 of the first RN 15 maps the first DRBID to the second DRBID and the transceiver 151 of the first RN 15 transmits the first S1-AP handover message 120 with the second DRBID. Then transceiver 171 of the second RN 17 receives the first S1-AP handover message 120 with the second DRBID from the first RN 15.

On the other hand, the handover procedures can be started from the second RN 17. Specifically, the transceiver 171 of the second RN 17 can transmit a second S1-AP handover message 174 with the second DRBID to the first RN 15. The processing unit 153 of the first RN 15 maps the second DRBID to the first DRBID after the transceiver 151 of the first RN 15 receives the second S1-AP handover message 174. Then the processing unit 153 of the first RN 15 updates the second S1-AP handover message 174 with the first DRBID. Afterwards, the transceiver 151 of the first RN 15 transmits the updated second 51-AP handover message 174 with the first DRBID to the eNB 15.

Afterwards, the processing unit 133 of the eNB 13 maps the first DRBID to the TEID after the transceiver 131 of the eNB 13 receives the second S1-AP handover message 174 with the first DRBID. Then, the processing unit 133 of the eNB 13 updates the second S1-AP handover message 174. Accordingly, the transceiver 131 of the eNB 13 transmits the second S1-AP handover message 174 with the TEID to the MME 11. It should be noted that the handover procedures can also be started from the first RN 15. Accordingly, if any handover of possible devices occurred in the LTE network 1, the correctness of the connections of the user-planes in the LTE network 1 can be assured based on the mapping relations between the E-RAB ID, TEID, the first DRBID and the second DRBID.

A fifth embodiment of the present invention is a connection initialization method. The connection method is for an eNB and a first RN used in an LTE network such as the LTE network 1 in the previous embodiments. Similarly, the LTE network comprises the eNB, an MME, a first RN and a second RN. The eNB connects with the MME. The first RN connects with the eNB. The second RN connects with the eNB via the first RN. The eNB pre-allocates a first identification group and a second identification group to the first RN and the second RN respectively.

Figure 5A:
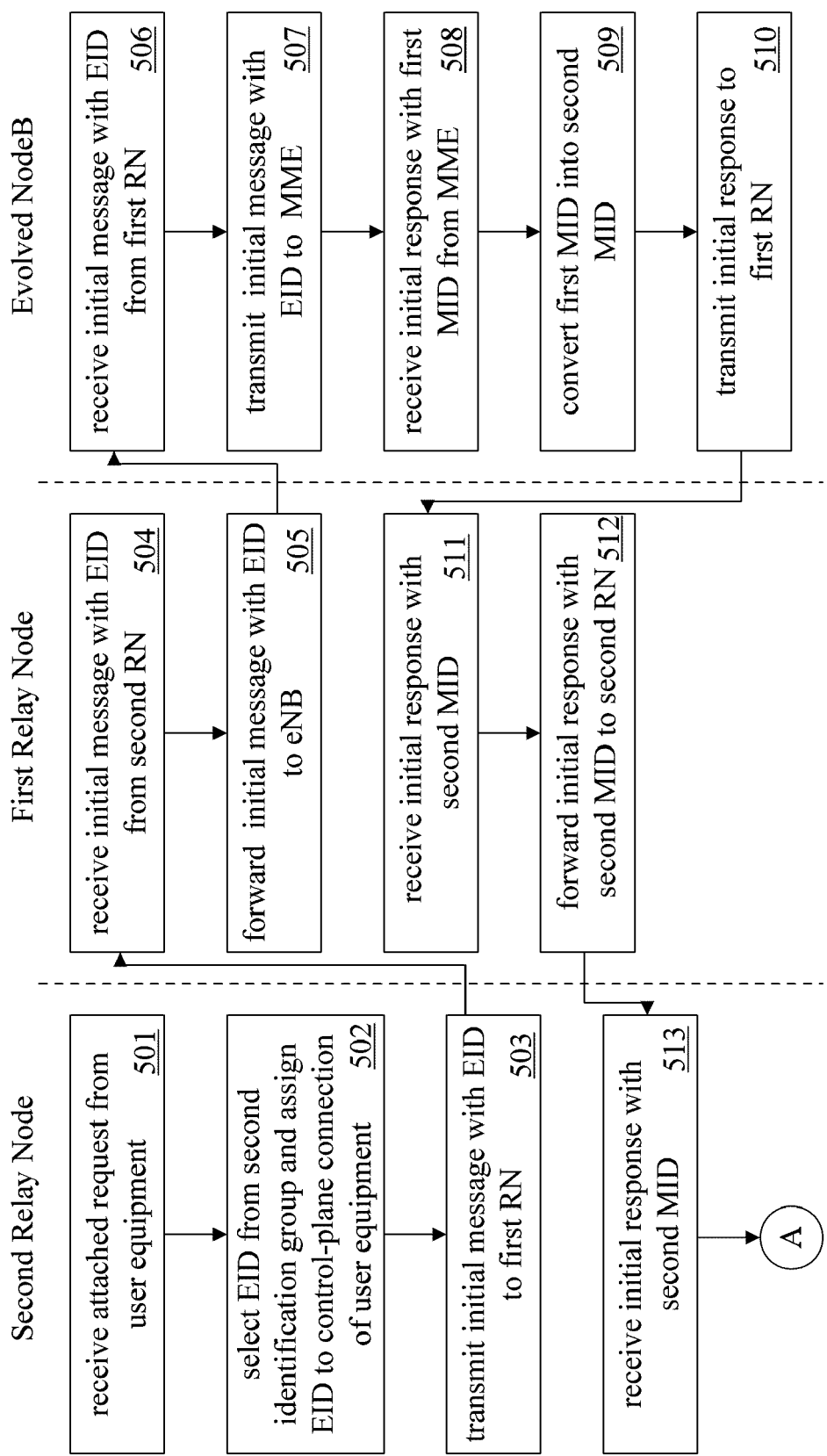
FIG. 5A-5B illustrate the flowchart of the fifth embodiment.
Figure 5B:
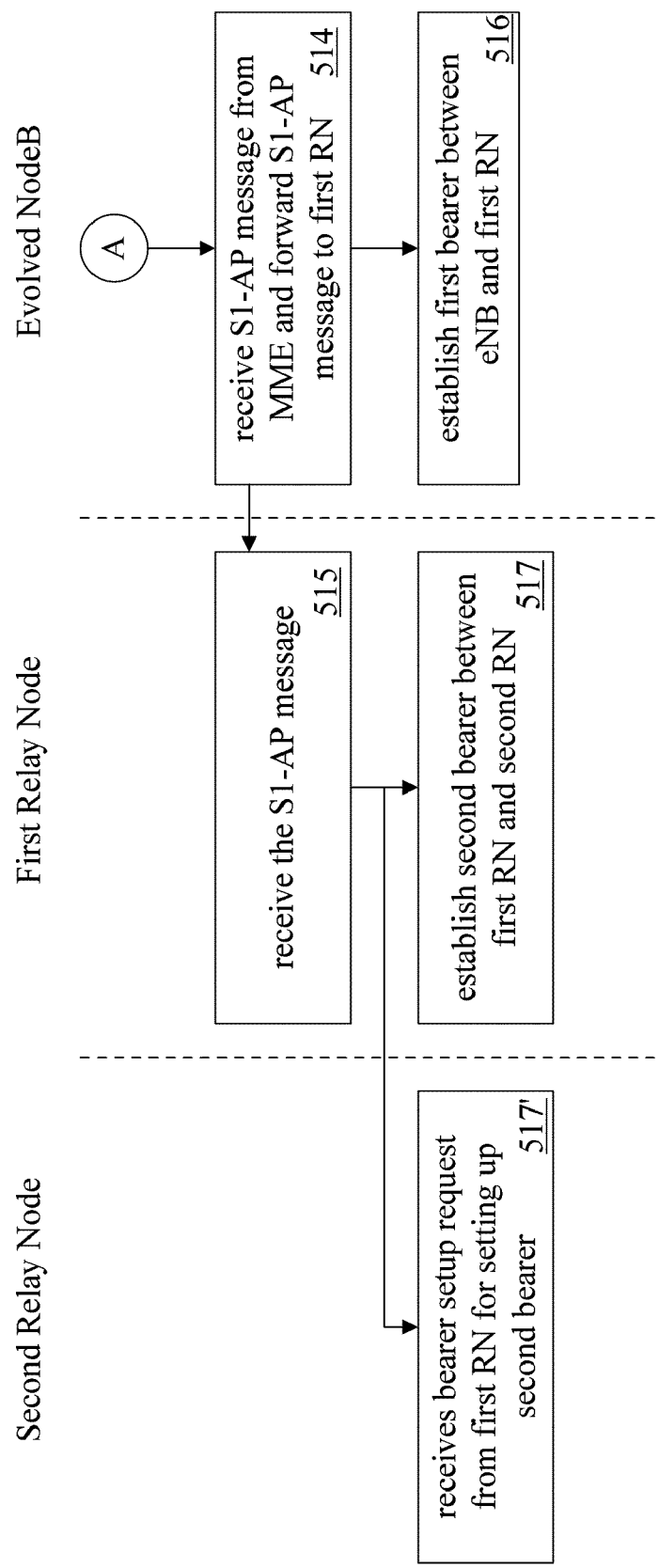

The flowchart of the connection initialization method is illustrated in FIGS. 5A and 5B. First, the connection initialization method executes step 501 to enable the second RN to receive an attached request from a user equipment. Step 502 is executed to enable the second RN to select an EID from the second identification group, and then assigns the EID to a control-plane connection of the user equipment. Hence, the control-plane connection of the user equipment can be identified in the LTE network based on the EID. Step 503 is executed to enable the second RN to transmit an initial message with the EID to the first RN. Step 504 is executed to enable the first RN to receive the initial message with the EID from the second RN. Step 505 is executed to enable the first RN to forward the initial message with the EID to the eNB. Step 506 is executed to enable the eNB to receive the initial message with the EID from the first RN. Step 507 is executed to enable the eNB to transmit the initial message with the EID to the MME. Step 508 is executed to enable the eNB to receive an initial response with a first MID from the MME. The first MID is assigned to the control-plane connection of the user equipment by the MME. Step 509 is executed to enable the eNB to convert the first MID into a second MID. Step 510 is executed to enable the eNB to transmit the initial response with the second MID to the second RN via the first RN. Step 511 is executed to enable first RN to receive the initial response with the second MID from the eNB. Step 512 is executed to enable the first RN to forward the initial response with the second MID to the second RN. Step 513 is executed to enable the second RN to receive the initial response with the second MID. Accordingly the establishment of the control-planes of the LTE network is accomplished.

Next, user-planes of the LTE network should be established. Step 514 is executed to enable the eNB to receive an S1-AP message from the MME and forward the S1-AP message to the first RN at the same time. Step 515 is executed to enable the first RN to receive the S1-AP message from the MME via the eNB. Step 516 is executed to enable the eNB to establish a first bearer between the eNB and the first RN according to the S1-AP message. Step 517 is executed to enable the first RN to establish a second bearer between the first RN and the second RN according to the S1-AP message. Step 517' is executed to enable the second RN receives a bearer setup request from the first RN for setting up the second bearer between the first RN and the second RN. It should ne noted that step 516, step 517 and Step 517' are executed at the same time; in other words, the first bearer and the second bearer are established at the same time.

Figure 5C:
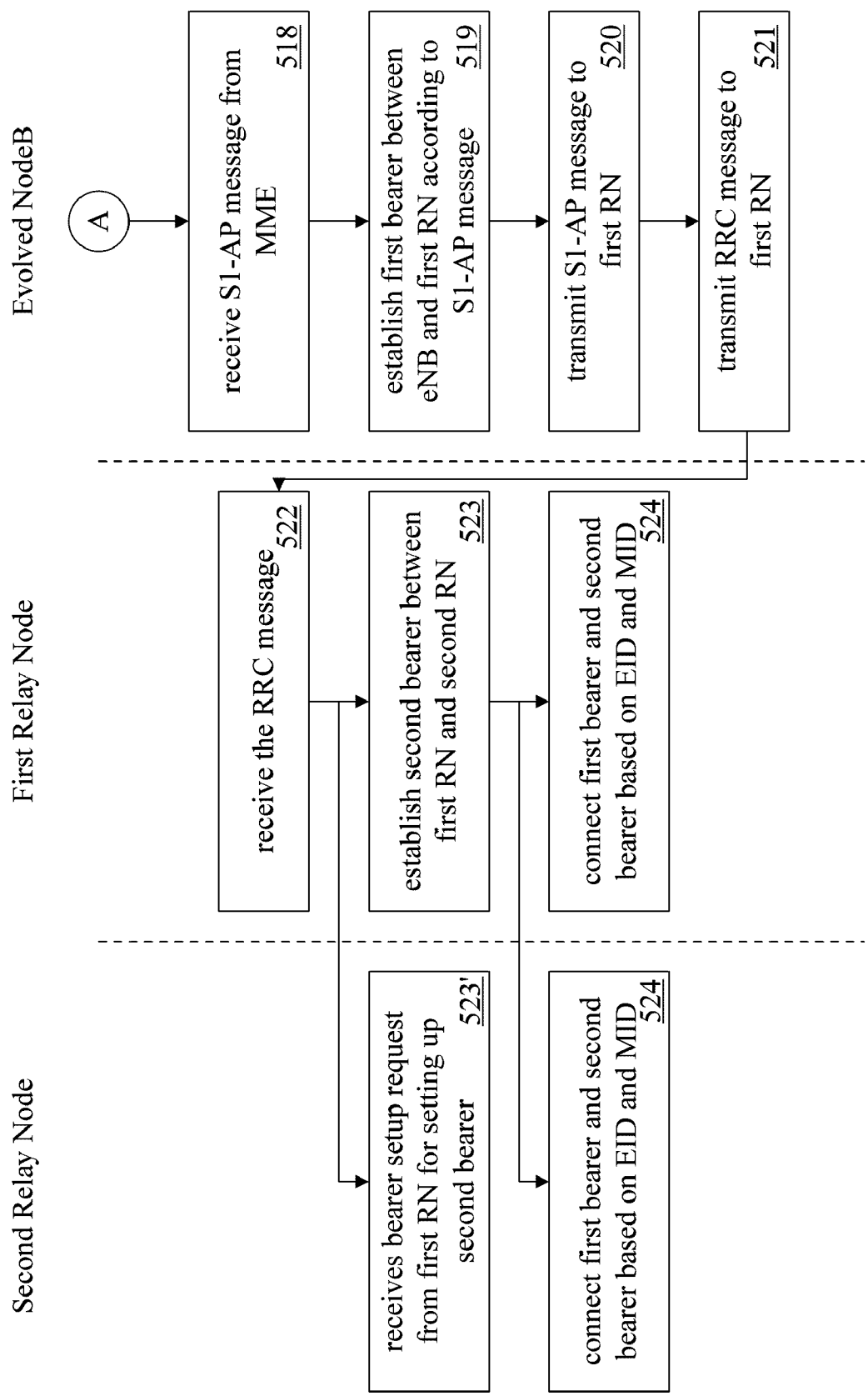
FIG. 5C illustrates the flowchart of the sixth embodiment.

A sixth embodiment of the present invention is a connection initialization method. The procedure of establishing the control-planes in the sixth embodiment is the same as the procedure in the fifth embodiment; hence, the steps 501-513 will not be described again. The difference between the sixth embodiment and the fifth embodiment is the establishment of the user-planes. Refer to FIG. 5C. Step 518 is executed to enable the eNB to receive an S1-AP message from the MME. Step 519 is executed to enable the eNB to establish a first bearer between the eNB and the first RN according to the S1-AP message. Step 520 is executed to enable the eNB to transmit the S1-AP message to the first RN. Step 521 is executed to enable the eNB to transmit a RRC message with the EID and the MID to the first RN. Step 522 is executed to enable the first RN to receive the RRC message from the eNB. Step 523 is executed to enable the first RN to establish the second bearer between the first RN and the second RN based on the RRC message. Step 523' is executed to enable the second RN receives a bearer setup request from the first RN for setting up the second bearer between the first RN and the second RN. Step 524 is executed to enable the first RN and the second RN to connect the first bearer and the second bearer based on the EID and MID.

Figure 5D:
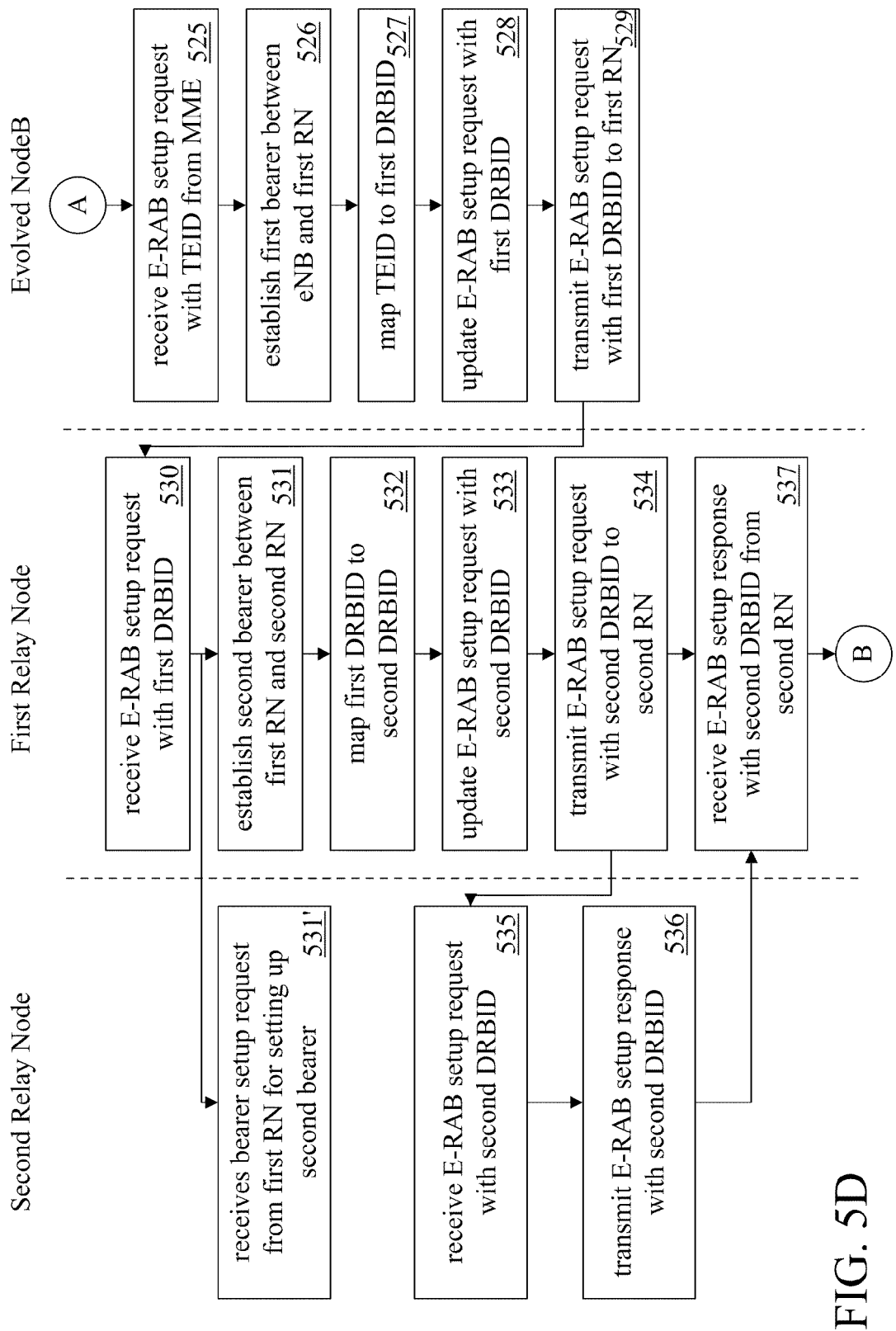
FIGS. 5D-5E illustrate the flowchart of the seventh embodiment.
Figure 5E:
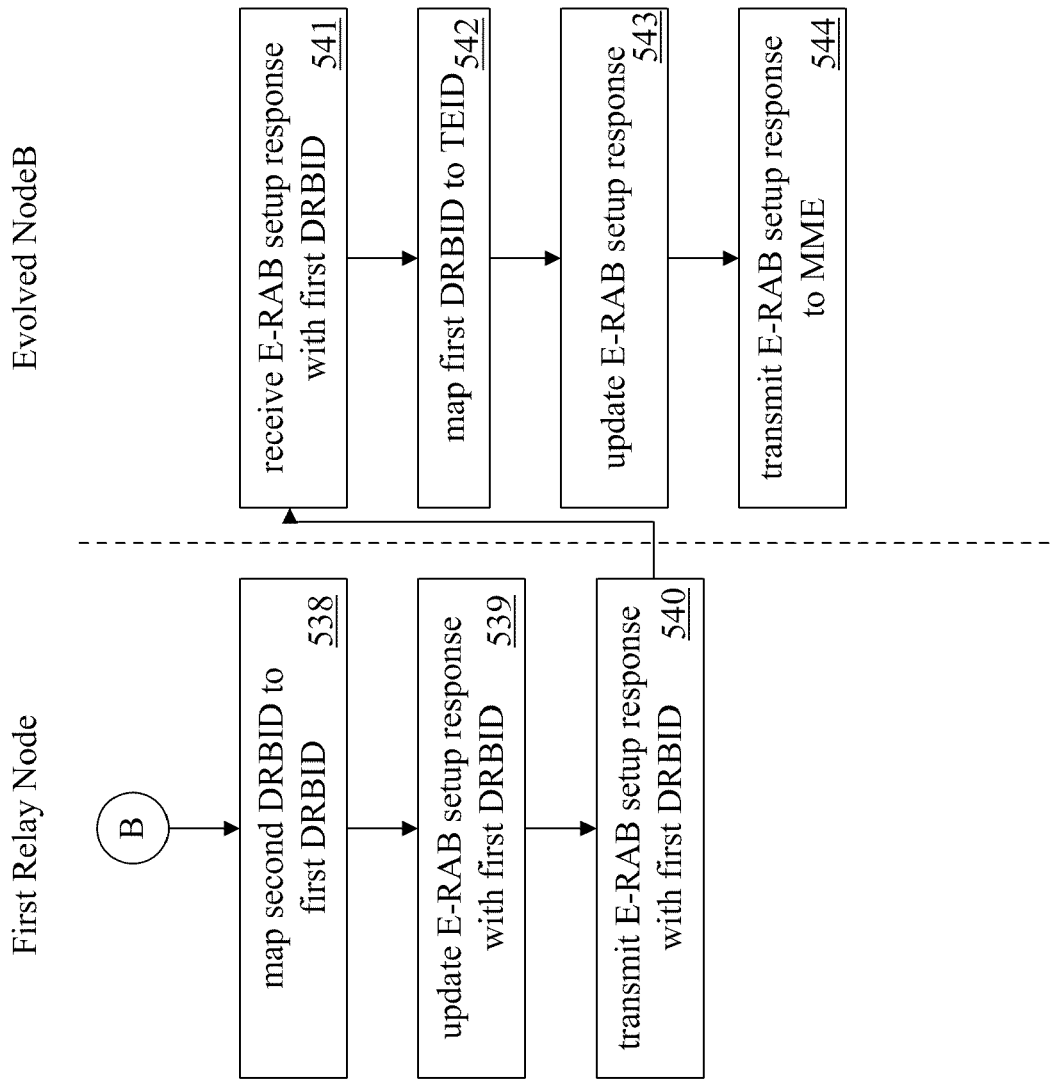
Figure 5F:
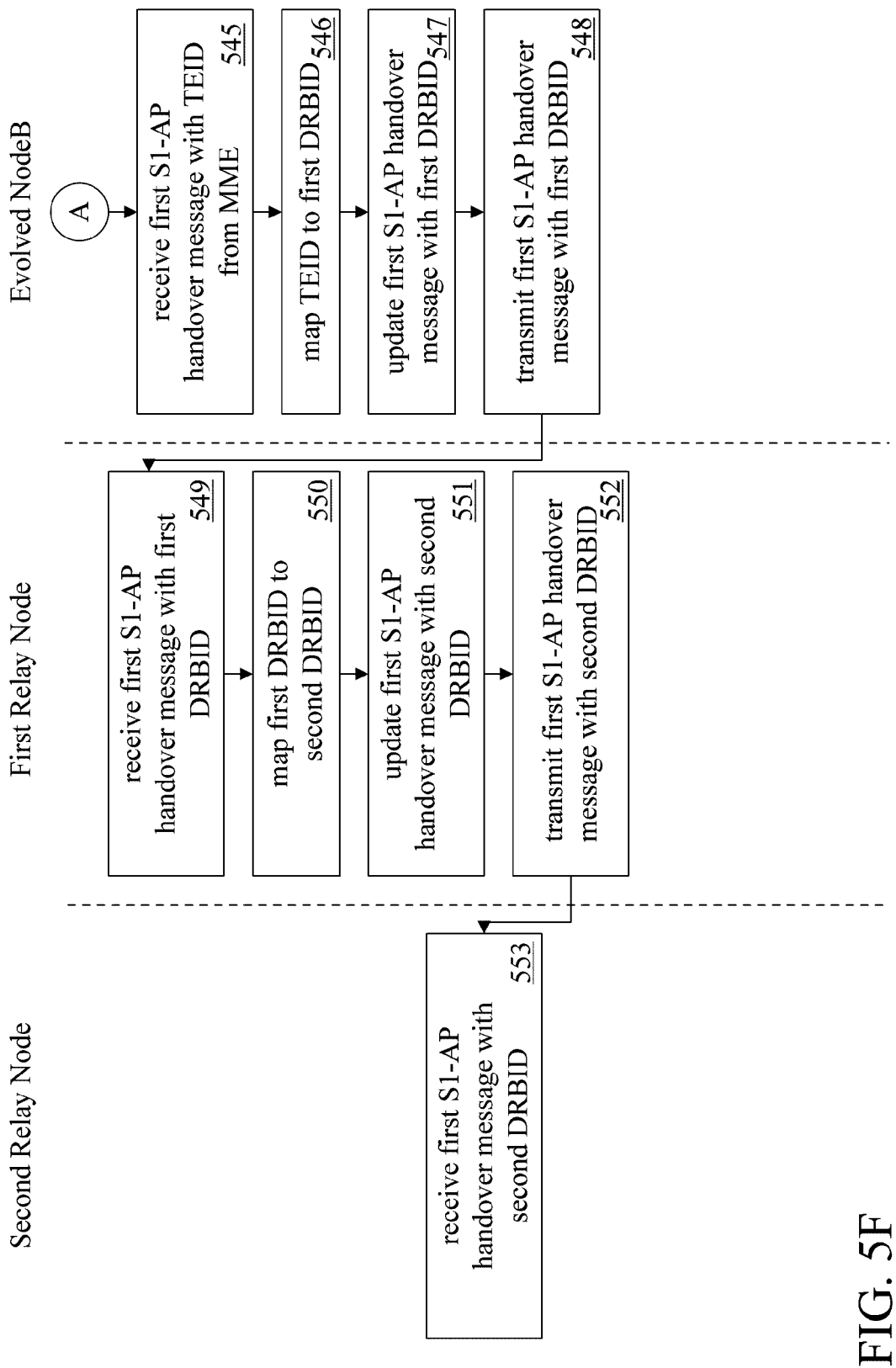
FIG. 5F illustrates the flowchart of the eight embodiment.

A seventh embodiment of the present invention is a connection initialization method. The procedure of establishing the control-planes in the seventh embodiment is the same as the procedure in the fifth embodiment; hence, the steps 501-513 will not be described again. The difference between the seventh embodiment and the fifth embodiment is the establishment of the user-planes. Refer to FIGS. 5D-5E. Step 525 is executed to enable the eNB to receive an E-RAB setup request with a TEID from the MME. Step 526 is executed to enable the eNB to establish a first bearer between the eNB and the first RN according to the E-RAB setup request. Step 527 is executed to enable the eNB to map the TEID to a first DRBID. Step 528 is executed to enable the eNB to update the E-RAB setup request with the first DRBID. Step 529 is executed to enable the eNB to transmit the E-RAB setup request with the first DRBID to the first RN.

Step 530 is executed to enable the first RN to receive the E-RAB setup request with the first DRBID. Step 531 is executed to enable the first RN to establish a second bearer between the first RN and the second RN according to the E-RAB setup request with the first DRBID. Step 531' is executed to enable the second RN receives a bearer setup request from the first RN for setting up the second bearer between the first RN and the second RN. Step 532 is executed to enable the first RN to map the first DRBID to a second DRBID. Step 533 is executed to enable the first RN to update the E-RAB setup request with the second DRBID. Step 534 is executed to enable the first RN to transmit the E-RAB setup request with the second DRBID to the second RN. Step 535 is executed to enable the second RN to receive the E-RAB setup request with the second DRBID from the first RN.

Similarly, Step 536 is executed to enable the second RN to transmit an E-RAB setup response to the first RN. Step 537 is executed to enable the first RN to receive the E-RAB setup response with the second DRBID from the second RN. Step 538 is executed to enable the first RN to map the second DRBID to the first DRBID. Step 539 is executed to enable the first RN to update the E-RAB setup response with the first DRBID. Step 540 is executed to enable the first RN to transmit the E-RAB setup response with the first DRBID to the eNB.

Step 541 is executed to enable the eNB to receive the E-RAB setup response with the first DRBID from the first RN. Step 542 is executed to enable the eNB to map the first DRBID to the TEID. Step 543 is executed to enable the eNB to update the E-RAB setup response. Step 544 is executed to enable the eNB to transmit the E-RAB setup response with the TEID to the MME.

It should be noted that, in the seventh embodiment, the E-RAB setup request can be replaced by an initial context setup request while the E-RAB setup response can be replaced by an initial context setup response. It can be easily understood by the people skilled in the LTE field.

An eighth embodiment of the present invention is a connection initialization method for handover. The handover procedures start from the MME. Please refer to FIG. 5E Step 545 is executed to enable the eNB to receive a first S1-AP handover message with a TEID from the MME. Step 546 is executed to enable the eNB to map the TEID to a first DRBID. Step 547 is executed to enable the eNB to update the first S1-AP handover message with the first DRBID. Step 548 is executed to enable the eNB to transmit the first S1-AP handover message with the first DRBID to the first RN.

Step 549 is executed to enable the first RN to receive the first S1-AP handover message with the first DRBID. Step 550 is executed to enable the first RN to map the first DRBID to a second DRBID. Step 551 is executed to enable the first RN to update the first S1-AP handover message with the second DRBID. Step 552 is executed to enable the first RN to transmit the first S1-AP handover message with the second DRBID to the second RN. Step 553 is executed to enable the second RN to receive the first 51-AP handover message with the second DRBID from the first RN.

Similarly, a ninth embodiment of the present invention is a connection initialization method for handover. However, the difference between the eighth embodiment and the ninth embodiment is that the handover procedures of ninth embodiment start from the second RN.

Figure 5G:
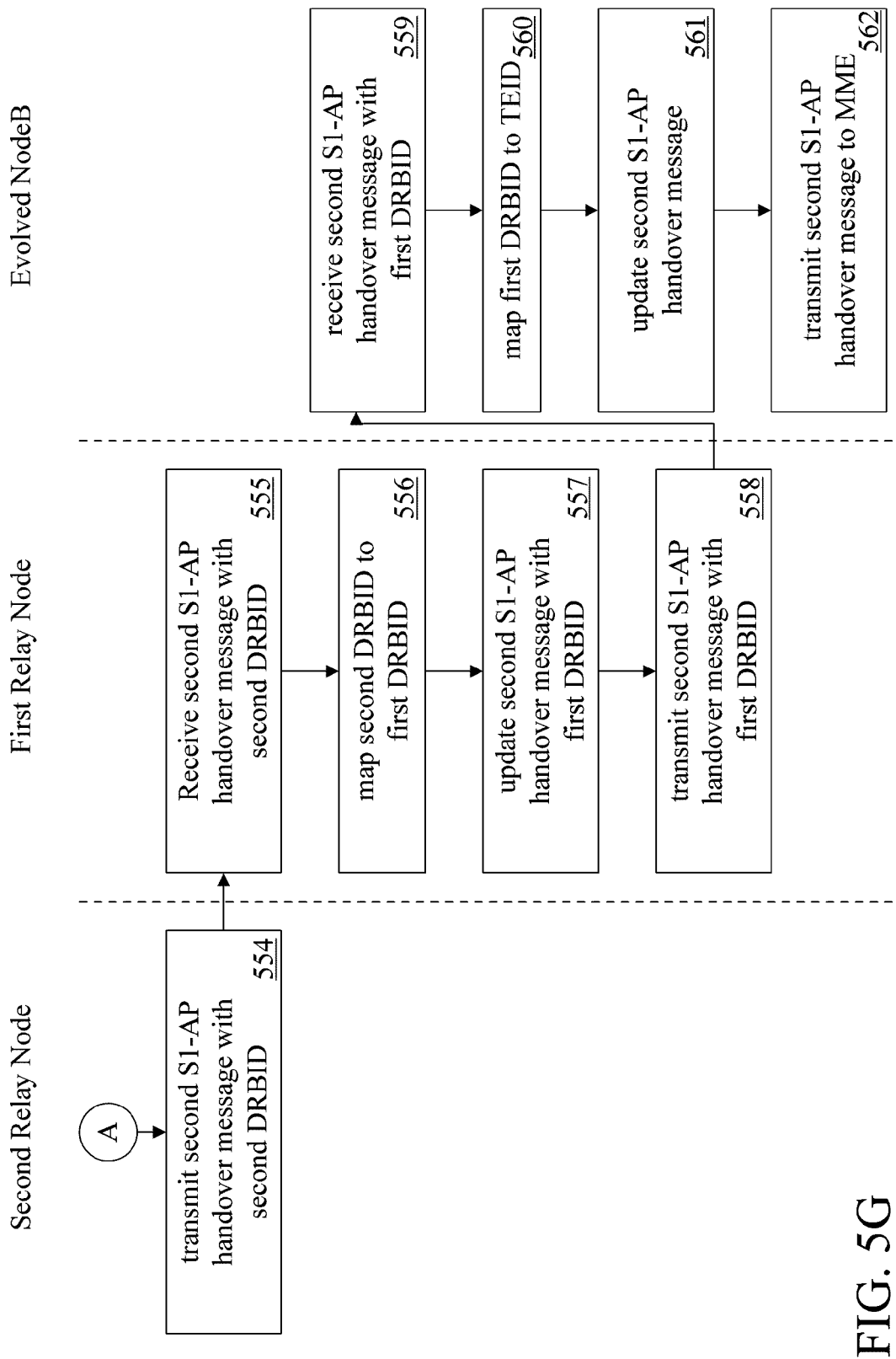
FIG. 5G illustrates the flowchart of the ninth embodiment.

Particularly, please refer to FIG. 5G Step 554 is executed to enable the second RN to transmit a second S1-AP handover message with the second DRBID to the first RN. Step 555 is executed to enable the first RN to receive the second S1-AP handover message with the second DRBID from the second RN. Step 556 is executed to enable the first RN to map the second DRBID to the first DRBID. Step 557 is executed to enable the first RN to update the second S1-AP handover message with the first DRBID. Step 558 is executed to enable the first RN to transmit the second S1-AP handover message with the first DRBID to the eNB.

Step 559 is executed to enable the eNB to receive the second S1-AP handover message with the first DRBID from the first RN. Step 560 is executed to enable the eNB to map the first DRBID to the TEID. Step 561 is executed to enable the eNB to update the second S1-AP handover message. Step 562 is executed to enable the eNB to transmit the second S1-AP handover message with the TEID to the MME.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A connection initialization method for an evolved NodeB (eNB), the eNB being adapted for use in a long term evolution (LTE) network, the LTE network comprising the eNB, a mobility management entity (MME), a first relay node (RN) and a second RN, the eNB connecting with the MME, the first RN connecting with the eNB, the second RN connecting with the eNB via the first RN, the eNB pre-allocating a first identification group and a second identification group to the first RN and the second RN respectively, the connection initialization method comprising the following steps:
   (a) enabling the eNB to receive an initial message with an eNB-UE-S1AP identification (EID) from the second RN via the- first RN after the second RN receives an attached request from a user equipment, wherein the EID is selected from the second identification group and assigned to a control-plane connection of the user equipment by the second RN;
   (b) enabling the eNB to transmit the initial message with the EID to the MME;
   (c) enabling the eNB to receive an initial response with a first MME-UE-S1AP identification (MID) from the MME after step (b), wherein the first MID is assigned to the control-plane connection of the user equipment by the MME;
   (d) enabling the eNB to convert the first MID into a second MID;
   (e) enabling the eNB to transmit the initial response with the second MID to the second RN via the first RN.

2. The connection initialization method as claimed in claim 1, further comprising the following steps after step (e):
   (f) enabling the eNB to receive an S1-AP message from the MME and forward the S1-AP message to the first RN at the same time;
   (g) enabling the eNB to establish a first bearer between the eNB and the first RN according to the S1-AP message while the first RN establishes a second bearer between the first RN and the second RN according to the S1-AP message.

3. The connection initialization method as claimed in claim 1, further comprising the following steps after step (e):
   (f) enabling the eNB to receive an S1-AP message from the MME;
   (g) enabling the eNB to establish a first bearer between the eNB and the first RN according to the S1-AP message;
   (h) enabling the eNB to transmit the S1-AP message to the first RN after step (g) so that the first RN can establish a second bearer between the first RN and the second RN.

4. The connection initialization method as claimed in claim 3, wherein the step (h) further comprises the following step:
   (h1) enabling the eNB to transmit an radio resource control (RRC) message with the EID and the second MID to the first RN so that the first RN can establish the second bearer between the first RN and the second RN based on the RRC message and connect the first bearer and the second bearer based on the EID and second MID.

5. The connection initialization method as claimed in claim 1, further comprising the following steps after step (e):
   (f) enabling the eNB to receive an E-UTRAN radio access bearer (E-RAB) setup request or initial context setup request with a tunnel endpoint identifier (TEID) from the MME;
   (g) enabling the eNB to establish a first bearer between the eNB and the first RN according to the E-RAB setup request or initial context setup request;
   (h) enabling the eNB to map the TEID to a data radio bearer identification (DRBID);
   (i) enabling the eNB to update the E-RAB setup request or initial context setup request with the DRBID;
   (j) enabling the eNB to transmit the E-RAB setup request or initial context setup request with the DRBID to the first RN;
   (k) enabling the eNB to receive an E-RAB setup response or initial context setup response with the DRBID from the first RN;
   (l) enabling the eNB to map the DRBID to the TEID;
   (m) enabling the eNB to update the E-RAB setup response or initial context setup response;
   (n) enabling the eNB to transmit the E-RAB setup response or initial context setup response with the TEID to the MME.

6. The connection initialization method as claimed in claim 1, further comprising the following steps after step (e):
   (f) enabling the eNB to receive a first S1-AP handover message with a tunnel endpoint identifier (TEID) from the MME;
   (g) enabling the eNB to map the TEID to a data radio bearer identification (DRBID);
   (h) enabling the eNB to update the first S1-AP handover message with the DRBID;
   (i) enabling the eNB to transmit the first S1-AP handover message with the DRBID to the first RN.

7. The connection initialization method as claimed in claim 1, further comprising the following steps after step (e):
- (f) enabling the eNB to receives a second S1-AP handover message with the DRBID from the first RN;
- (g) enabling the eNB to map the DRBID to the TEID;
- (h) enabling the eNB to update the second S1-AP handover message;
- (i) enabling the eNB to transmit the second S1-AP handover message with the TEID to the MME.

8. A connection initialization method for a first relay node (RN), the first RN being adapted for use in a long term evolution (LTE) network, the LTE network comprising an evolved NodeB (eNB), a mobility management entity (MME), the first RN and a second RN, the eNB connecting with the MME, the first RN connecting with the eNB, the second RN connecting with the eNB via the first RN, the eNB pre-allocating a first identification group and a second identification group to the first RN and the second RN respectively, the initialization method comprising the following steps:
- (a) enabling the first RN to receive an initial message with an eNB-UE-S1AP identification (EID) from the second RN after the second RN receives an attached request from a user equipment, wherein the EID is selected from the second identification group and assigned to a control-plane connection of the user equipment by the second RN;
- (b) enabling the first RN to forward the initial message with the EID to the eNB so that the eNB can forward the initial message with the EID to the MME;
- (c) enabling the first RN to receive an initial response with a second MME-UE-S1AP identification (MID) from the eNB after step (b), wherein the second MID is converted from a first MID by the eNB after the MME assigns the first MID to the control-plane connection of the user equipment and transmits the initial response with the first MID to the eNB;
- (d) enabling the first RN to forward the initial response with the second MID to the second RN.

9. The connection initialization method as claimed in claim 8, further comprising the following steps after step (d):
- (e) enabling the first RN to receive an S1-AP message from the MME via the eNB while the eNB receives the S1-AP message from the MME;
- (f) enabling the first RN to establish a second bearer between the first RN and the second RN according to the S1-AP message while the eNB establishes a first bearer between the first RN and the eNB according to the S1-AP message.

10. The connection initialization method as claimed in claim 8, further comprising the following steps after step (d):
- (e) enabling the first RN to establish a first bearer between the first RN and the eNB after the eNB receives an S1-AP message from the MME;
- (f) enabling the first RN to receive the S1-AP message from the eNB after step (e);
- (g) enabling the first RN to establish a second bearer between the first RN and the second RN after receiving the S1-AP.

11. The connection initialization method as claimed in claim 10, wherein the step (f) further comprises the following step:
- (f1) enabling the first RN to receive a radio resource control (RRC) message with the EID and the second MID from the eNB.

12. The connection initialization method as claimed in claim 11, wherein the step (g) further comprises the following step:
- (g1) enabling the first RN to establish the second bearer between the first RN and the second RN based on the RRC message and connect the first bearer and the second bearer based on the EID and second MID.

13. The connection initialization method as claimed in claim 8, further comprising the following steps after step (d):
- (e) enabling the first RN to receive an E-UTRAN radio access bearer (E-RAB) setup request or initial context setup request with a first data radio bearer identification (DRBID);
- (f) enabling the first RN to establish a second bearer between the first RN and the second RN according to the E-RAB setup request or initial context setup request with the first DRBID;
- (g) enabling the first RN to map the first DRBID to a second DRBID;
- (h) enabling the first RN to update the E-RAB setup request or initial context setup request with the second DRBID;
- (i) enabling the first RN to transmit the E-RAB setup request or initial context setup request with the second DRBID to the second RN;
- (j) enabling the first RN to receive an E-RAB setup response or initial context setup response with the second DRBID from the second RN;
- (k) enabling the first RN to map the second DRBID to the first DRBID;
- (l) enabling the first RN to update the E-RAB setup response or initial context setup response with the first DRBID;
- (m) enabling the first RN to transmit the E-RAB setup response or initial context setup response with the first DRBID to the eNB.

14. The connection initialization method as claimed in claim 8, further comprising the following steps after step (d):
- (e) enabling the first RN to receive a first S1-AP handover message with a first data radio bearer identification (DRBID) from the eNB;
- (f) enabling the first RN to map the first DRBID to a second DRBID;
- (g) enabling the first RN to update the first S1-AP handover message with the second DRBID;
- (h) enabling the first RN to transmit the first S1-AP handover message with the second DRBID to the second RN.

15. The connection initialization method as claimed in claim 8, further comprising the following steps after step (d):
- (e) enabling the first RN to receive a second S1-AP handover message with the second DRBID from the second RN;
- (f) enabling the first RN to map the second DRBID to the first DRBID;
- (i) enabling the first RN to update the second S1-AP handover message with the first DRBID;
- (j) enabling the first RN to transmit the second S1-AP handover message with the first DRBID to the eNB.

16. A connection initialization method for a second relay node (RN), the second RN being adapted for use in a long term evolution (LTE) network, the LTE network comprising an evolved NodeB (eNB), a mobility management entity (MME), a first RN and the second RN, the eNB connecting with the MME, the first RN connecting with the eNB, the second RN connecting with the eNB via the first RN, the eNB pre-allocating a first identification group and a second identification group to the first RN and the second RN respectively, the initialization method comprising the following steps:

(a) enabling the second RN to receive an attached request from a user equipment;

(b) enabling the second RN to select an eNB-UE-S1AP identification (EID) from the second identification group and to assign the EID to a control-plane connection of the user equipment;

(c) enabling the second RN to transmit an initial message with the EID to the eNB via the first RN;

(d) enabling the second RN to receive an initial response with a second MME-UE-S1-AP identification (MID) from the eNB via the first RN after the eNB converts a first MID to the second MID, wherein the first MID is assigned to the control-plane connection of the user equipment by the MME when the MME transmits the initial response with the first MID to the eNB.

17. The connection initialization method as claimed in claim 16, further comprising the following steps after step (d):

(e) enabling the second RN to receive a bearer setup request from the first RN for setting up a second bearer between the first RN and the second RN while the first RN establishes a first bearer between the eNB and the first RN after the eNB and the first RN receive an S1-AP message from the MME at the same time.

18. The connection initialization method as claimed in claim 16, further comprising the following steps after step (d):

(e) enabling the second RN to receive a bearer setup request from the first RN for setting up a second bearer between the first RN and the second RN after the first RN establishes a first bearer between the first RN and the eNB and receives an S1-AP message from the eNB.

19. The connection initialization method as claimed in claim 18, wherein the step (e) further comprises the following step:

(e1) enabling the second RN to receive a bearer setup request from the first RN for setting up a second bearer between the first RN and the second RN based on a radio resource control (RRC) message of the first RN, wherein the RRC message comprises the EID and the second MID;

(e2) enabling the second RN to connect the second bearer with the first bearer based on the EID and the second MID.

20. The connection initialization method as claimed in claim 16, further comprising the following steps after step (d):

(e) enabling the second RN to receive a bearer setup request from the first RN for setting up a second bearer between the first RN and the second RN after the first RN receives an E-UTRAN radio access bearer (E-RAB) setup request or initial context setup request with a first data radio bearer identification (DRBID);

(f) enabling the second RN to receive the E-RAB setup request or initial context setup request with a second DRBID from the first RN after the first RN maps the first DRBID to the second DRBID;

(g) enabling the second RN to transmit an E-RAB setup response or initial context setup response with the second DRBID to the first RN.

21. The connection initialization method as claimed in claim 16, further comprising the following steps after step (d):

(e) enabling the second RN to receive a first S1-AP handover message with a second data radio bearer identification (DRBID) from the first RN after the first RN receives the first S1-AP handover message with a first DRBID and maps the first DRBID to the second DRBID;

(f) enabling the second RN to transmit a second S1-AP handover message with the second DRBID to the first RN.

22. An evolved NodeN (eNB) for use in a long term evolution (LTE) network, the LTE network comprising the eNB, a mobility management entity (MME), a first relay node (RN) and a second RN, the eNB connecting with the MME, the first RN connecting with the eNB, the second RN connecting with the eNB via the first RN, the eNB pre-allocating a first identification group and a second identification group to the first RN and the second RN respectively, the eNB comprising:

a transceiver; and a processing unit;

wherein the transceiver is configured to receive an initial message with an eNB-UE-S1AP identification (EID) from the second RN via the first RN after the second RN receives an attached request from a user equipment, to transmit the initial message with the EID to the MME and to receive an initial response with a first MME-UE-S1AP identification (MID) from the MME, the EID is selected from the second identification group and assigned to a control-plane connection of the user equipment by the second RN, the first MID is assigned to the control-plane connection of the user equipment by the MME, the processing unit is configured to convert the first MID into a second MID, and the transceiver is further configured to transmit the initial response with the second MID to the second RN via the first RN.

23. The eNB as claimed in claim 22, wherein the transceiver is further configured to receive an S1-AP message from the MME and forward the S1-AP message to the first RN at the same time, the processing unit is further configured to establish a first bearer between the eNB and the first RN according to the S1-AP message while the first RN establishes a second bearer between the first RN and the second RN according to the S1-AP message.

24. The eNB as claimed in claim 22, wherein the transceiver is further configured to receive an S1-AP message from the MME, the processing unit is further configured to establish a first bearer between the eNB and the first RN according to the S1-AP message, and the transceiver is further configured to transmit the S1-AP message to the first RN so that the first RN can establish a second bearer between the first RN and the second RN.

25. The eNB as claimed in claim 24, wherein the transceiver is further configured to transmit a radio resource control (RRC) message with the EID and the second MID to the first RN so that the first RN can establish the second bearer between the first RN and the second RN based on the RRC message and connect the first bearer and the second bearer based on the EID and second MID.

26. The eNB as claimed in claim 22, wherein the transceiver is further configured to receive an E-UTRAN radio access bearer (E-RAB) setup request or initial context setup request with a tunnel endpoint identifier (TEID) from the MME, the processing unit is further configured to establish a first bearer between the eNB and the first RN according to the E-RAB setup request or initial context setup request, to map the TEID to a data radio bearer identification (DRBID) and to update the E-RAB setup request or initial context setup request with the DRBID, the transceiver is further configured to transmit the E-RAB setup request or initial context setup request with the DRBID to the first RN and to receives an E-RAB setup response or initial context setup response with the DRBID from the first RN, the processing unit is further configured to map the DRBID to the TEID and to update the E-RAB setup response or initial context setup response, and the transceiver is further configured to transmit the E-RAB setup response or initial context setup response with the TEID to the MME.

27. The eNB as claimed in claim 22, wherein the transceiver is further configured to receive a first S1-AP handover message with a tunnel endpoint identifier (TEID) from the MME, the processing unit is further configured to map the TEID to a data radio bearer identification (DRBID) and to update the first S1-AP handover message with the DRBID, and the transceiver is further configured to transmit the first S1-AP handover message with the DRBID to the first RN.

28. The eNB as claimed in claim 22, wherein the transceiver is further configured to receives a second S1-AP handover message with the DRBID from the first RN, the processing unit is further configured to map the DRBID to the TEID and to update the second S1-AP handover message, and the transceiver is further configured to transmit the second S1-AP handover message with the TEID to the MME.

29. A first relay node (RN) for use in a long term evolution (LTE) network, the LTE network comprising an evolved NodeB (eNB), a mobility management entity (MME), the first RN and a second RN, the eNB connecting with the MME, the first RN connecting with the eNB, the second RN connecting with the eNB via the first RN, the eNB pre-allocating a first identification group and a second identification group to the first RN and the second RN respectively, the first RN comprising:
a transceiver;
wherein the transceiver is configured to receive an initial message with an eNB-UE-S1AP identification (EID) from the second RN after the second RN receives an attached request from a user equipment, to forward the initial message with the EID to the eNB so that the eNB can forward the initial message with the EID to the MME, to receive an initial response with a second MME-UE-S1AP identification (MID) from the eNB, and to forward the initial response with a second MID to the second RN;
wherein the EID is selected from the second identification group and assigned to a control-plane connection of the user equipment by the second RN, the second MID is converted from a first MID by the eNB after the MME assigns the first MID to the control-plane connection of the user equipment and transmits the initial response with the first MID to the eNB.

30. The first RN as claimed in claim 29, further comprising:
a processing unit;
wherein the transceiver is further configured to receive an S1-AP message from the MME via the eNB while the eNB receives the S1-AP message from the MME, and the processing unit is configured to establish a second bearer between the first RN and the second RN according to the S1-AP message while the eNB establishes a first bearer between the first RN and the eNB according to the S1-AP message.

31. The first RN as claimed in claim 29, further comprising:
a processing unit;
wherein the processing unit is configured to establish a first bearer between the first RN and the eNB after the eNB receives an S1-AP message from the MME, the transceiver is further configured to receive the S1-AP message from the eNB, and the processing unit is further configured to establish a second bearer between the first RN and the second RN after the transceiver receives the S1-AP.

32. The first RN as claimed in claim 31, wherein the transceiver is further configured to receive a radio resource control (RRC) message with the EID and the second MID from the eNB.

33. The first RN as claimed in claim 32, wherein the processing unit is further configured to establish the second bearer between the first RN and the second RN based on the RRC message and connect the first bearer and the second bearer based on the EID and the second MID.

34. The first RN as claimed in claim 29, further comprising:
a processing unit;
wherein the transceiver is further configured to receive an E-UTRAN radio access bearer (E-RAB) setup request or initial context setup request with a first data radio bearer identification (DRBID), the processing unit is further configured to establish a second bearer between the first RN and the second RN according to the E-RAB setup request or initial context setup request with the first DRBID, to map the first DRBID to a second DRBID and to update the E-RAB setup request or initial context setup request with the second DRBID, the transceiver is further configured to transmit the E-RAB setup request or initial context setup request with the second DRBID to the second RN, furthermore and to receive an E-RAB setup response or initial context setup response with the second DRBID from the second RN, the processing unit is further configured to map the second DRBID to the first DRBID and to update the E-RAB setup response or initial context setup response with the first DRBID, and the transceiver is further configured to transmit the E-RAB setup response or initial context setup response with the first DRBID to the eNB.

35. The first RN as claimed in claim 29, further comprising:
a processing unit;
wherein the transceiver is further configured to receive a first S1-AP handover message with a first data radio bearer identification (DRBID) from the eNB, the processing unit is further configured to map the first DRBID to a second DRBID and to update the first S1-AP handover message with the second DRBID, and the transceiver is further configured to transmit the first S1-AP handover message with the second DRBID to the second RN.

36. The first RN as claimed in claim 29, wherein the transceiver is further configured to receive a second S1-AP handover message with the second DRBID from the second RN, the processing unit is further configured to map the second DRBID to the first DRBID and to update the second S1-AP handover message with the first DRBID, and the transceiver is further configured to transmit the second S1-AP handover message with the first DRBID to the eNB.

37. A second relay node (RN) for use in a long term evolution (LTE) network, the LTE network comprising an evolved NodeB (eNB), a mobility management entity (MME), a first RN and the second RN, the eNB connecting with the MME, the first RN connecting with the eNB, the second RN connecting with the eNB via the first RN, the eNB pre-allocating a first identification group and a second identification group to the first RN and the second RN respectively, the second RN comprising:
a transceiver;
a processing unit;

wherein the transceiver is configured to receive an attached request from a user equipment, the processing unit is configured to select an eNB-UE-S1AP identification (EID) from the second identification group and to assign the EID to a control-plane connection of the user equipment, and the transceiver is further configured to transmit an initial message with the EID to the eNB via the first RN and to receive an initial response with a second MME-UE-S1AP identification (MID) from the eNB via the first RN after the eNB converts a first MID to the second MID;

wherein the first MID is assigned to the control-plane connection of the user equipment by the MME after the MME transmits the initial response with the first MID to the eNB.

38. The second RN as claimed in claim 37, wherein the transceiver is further configured to receive a bearer setup request from the first RN for the processing unit to set up a second bearer between the first RN and the second RN while the first RN establishes a first bearer between the eNB and the first RN after the eNB and the first RN receive an S1-AP message from the MME at the same time.

39. The second RN as claimed in claim 37, wherein the transceiver is further configured to receive a bearer setup request from the first RN for the processing unit to set up a second bearer between the first RN and the second RN after the first RN establishes a first bearer between the first RN and the eNB and receives an S1-AP message from the eNB.

40. The second RN as claimed in claim 39, wherein the transceiver is further configured to receive a bearer setup request from the first RN for the processing unit to set up a second bearer between the first RN and the second RN based on a radio resource control (RRC) message of the first RN, and the processing unit is further configured to connect the second bearer with the first bearer based on the EID and the second MID comprised in the RRC message.

41. The second RN as claimed in claim 37, wherein the transceiver is further configured to receive a bearer setup request from the first RN for the processing unit to set up a second bearer between the first RN and the second RN after the first RN receives an E-UTRAN radio access bearer (E-RAB) setup request or initial context setup request with a first data radio bearer identification (DRBID), to receive the E-RAB setup request or initial context setup request with a second DRBID from the first RN after the first RN maps the first DRBID to the second DRBID, and to transmit an E-RAB setup response or initial context setup response with the second DRBID to the first RN.

42. The second RN as claimed in claim 37, wherein the transceiver is further configured to receive a S1-AP handover message with a second data radio bearer identification (DRBID) from the first RN after the first RN receives the first S1-AP handover message with a first DRBID and maps the first DRBID to the second DRBID, and to transmit a second S1-AP handover message with the second DRBID to the first RN.

* * * * *